US006894735B2

(12) United States Patent
Chae et al.

(10) Patent No.: US 6,894,735 B2
(45) Date of Patent: May 17, 2005

(54) ARRAY SUBSTRATE OF LIQUID CRYSTAL DISPLAY DEVICE (75) Inventors: Gee Sung Chae, Incheon-kwangyokshi (KR); Ik Soo Kim, Gunpo (KR)

(73) Assignee: LG.Philips LCD Co. Ltd., Seoul (KR)

( * ) Notice: Subject to any disclaimer, the term of this patent is extended or adjusted under 35 U.S.C. 154(b) by 0 days.

(21) Appl. No.: 10/180,499

(22) Filed: Jun. 27, 2002

(65) Prior Publication Data

US 2003/0007107 A1 Jan. 9, 2003

(30) Foreign Application Priority Data

Jul. 6, 2001 (KR) ........................................ 2001-40463

(51) Int. Cl.⁷ ............................................ G02F 1/1343
(52) U.S. Cl. .......................................... 349/38; 349/39
(58) Field of Search .................................... 349/38, 39

(56) References Cited

U.S. PATENT DOCUMENTS 6,177,970 B1 * 1/2001 Kim ............................ 349/43
6,278,503 B1 * 8/2001 Nishikawa et al. ............ 349/39
6,400,424 B1 * 6/2002 Kim et al. .................... 349/38

FOREIGN PATENT DOCUMENTS

JP 11-119260 7/1999
KR 10-026240 5/2000

* cited by examiner

Primary Examiner—Tarifur R. Chowdhury
Assistant Examiner—Richard Kim
(74) Attorney, Agent, or Firm—McKenna Long & Aldridge LLP

(57) ABSTRACT

An array substrate of a liquid crystal display device, wherein picture quality is improved without decreasing aperture ratio by providing a storage capacitor of a large capacity. The array substrate of a liquid crystal display device includes a gate line formed on an array substrate and a gate electrode diverged from the gate line. A common line composed of substantially the same material as the gate line of an opaque metal is arranged parallel to the gate line. A first electrode of a storage capacitor composed of a transparent conductive material is formed on the common line. A gate insulating film covers the gate line, the gate electrode, and the first electrode of a storage capacitor. A semiconductor layer is formed to overlap the gate electrode on the gate insulating film. A source electrode and a drain electrode are arranged with a constant interval on the semiconductor layer. A data line is connected to the source electrode and is arranged perpendicularly to the gate line. An insulating layer is formed on the data line, the source/drain electrodes, and the gate insulating film. A first contact hole is formed by removing the insulating layer so as to expose a part of the drain electrode. A pixel electrode is connected to the drain electrode through the first contact hole above the insulating layer.

13 Claims, 7 Drawing Sheets

ARRAY SUBSTRATE OF LIQUID CRYSTAL DISPLAY DEVICE

This application claims the benefit of Korean Application No. P2001-040463 filed on Jul. 6, 2001, which is hereby incorporated by reference for all purposes as if fully set forth herein.

BACKGROUND OF THE INVENTION

1. Field of the Invention

The present invention relates to a liquid crystal display device, and more particularly, to an array substrate of a liquid crystal display device including a storage capacitor having a large capacity.

2. Discussion of the Related Art

Corresponding to a recent trend in flat panel display research, a liquid crystal display device is widely used as a replacement medium which can overcome defects of a cathode ray tube (CRT) because of high contrast ratio, ability to display a gray and dynamic screen, and low power consumption.

The liquid crystal display device is a switching device for applying voltage to a pixel region and shielding the voltage. The liquid crystal display device includes an array substrate having a pixel electrode which is a region for transmitting light for applying a signal voltage to a liquid crystal layer, a storage capacitor for lowering a level shift voltage and maintaining pixel information during a nonselective period of voltage application; a color filter substrate including a common electrode for applying voltage to a liquid crystal layer according to a voltage difference between the pixel electrode, a color filter layer for displaying colors and selectively transmitting light, and a black matrix for shielding part of the light where an alignment of a liquid crystal is not controlled; and a liquid crystal injected between the array substrate and the color filter substrate.

The storage capacitor maintains a charged voltage in a liquid crystal capacitor in a turn-off section of a thin film transistor so as to prevent a picture quality from being lowered by parasitic capacitance. The storage capacitor is divided into a storage on common and a storage on gate according to a method for forming a capacitor electrode. In the former method, a storage capacitor electrode is additionally wired and connected to a common electrode, and in the latter method, a part of the n-$1^{th}$ gate line is used as a storage capacitor electrode of the $n^{th}$ pixel. The latter method is also called a previous gate method.

In the storage on gate method, a separate capacitor line does not exist, thereby providing a high aperture ratio. Also, since there is no overlapped part between a data line and a capacitor line, likelihood of an open being formed in data line is reduced, thereby providing high yield. However, since a complete dot-inversion and a column-inversion, etc. are not realized in view of the electric charge of the pixel, a picture quality is relatively deteriorated.

On the contrary, in the storage on common method, since a capacitor line is additionally formed, an aperture ratio is lowered, but a picture quality is enhanced. Accordingly, the storage on common method is more appropriate in a liquid crystal display device if a problem of a low aperture ratio is to be solved.

Hereinafter, the related art array substrate of a liquid crystal display device will be explained with reference to the following drawings.

Figure 1A:
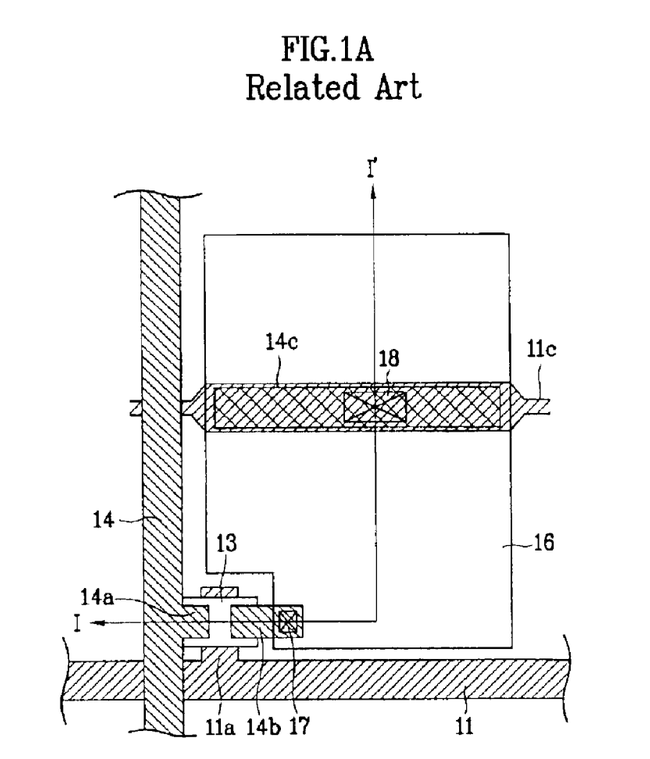
FIG. 1A illustrates a plan view of a related art liquid crystal display device.
Figure 1B:
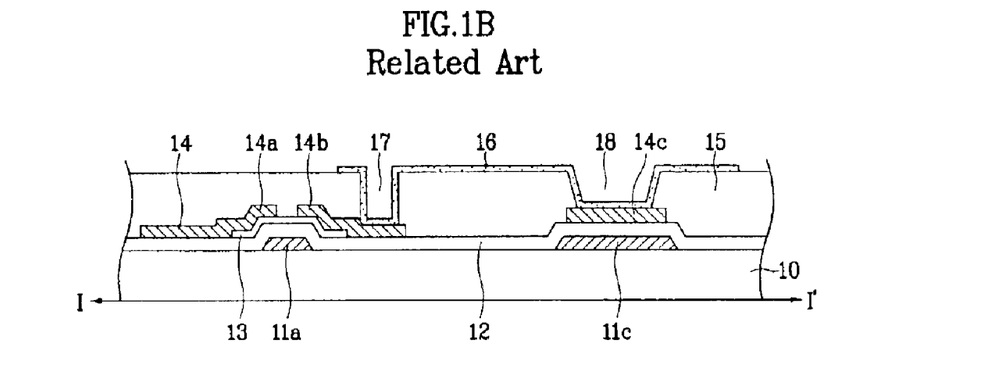
FIG. 1B illustrates a sectional view taken along line I–I' of FIG. 1A.

FIG. 1A illustrates a plan view of a related art liquid crystal display device, and FIG. 1B illustrates a sectional view taken along line I–I' of FIG. 1A.

As shown in FIGS. 1A and 1B, a liquid crystal display device including a storage capacitor formed by the storage on common method. The device includes an array substrate having a gate line crossing a data line to define a pixel region; a switching device formed at a crossing point of the two lines; a pixel electrode connected to the switching device and formed in the pixel region; and a storage capacitor parallel to the gate line in a predetermined portion of the pixel region.

The array substrate will be explained in more detail with a fabricating method. First, a conductive material such as Al, Al alloy, etc. is deposited on an entire surface of a substrate 10 and patterned by a photolithography method, so that a gate line 11, a gate electrode 11a, and a capacitor lower electrode 11c parallel to the gate line 11 are formed.

At this time, to obtain a storage capacitor having a large capacity, the size of the capacitor lower electrode 11c is set to be large.

Then, an inorganic insulating film is deposited on an entire surface including the gate line 11, thereby forming a gate insulating film 12. A semiconductor layer 13 is then formed as an independent island shape on the gate insulating film 12 above the gate electrode 11a.

Subsequently, a conductive material such as Al or Al alloy is deposited on an entire surface including the semiconductor layer 13, and patterned by a lithography method, so that a data line 14 crossing the gate line 11, source/drain electrodes 14a and 14b at both ends of the semiconductor layer 13, and a capacitor upper electrode 14c facing the capacitor lower electrode 11c are simultaneously formed.

At this time, the gate line 11 and the data line 14 cross each other, thereby defining a pixel region. Also, the gate electrode 11a, the gate insulating film 12, the semiconductor layer 13, and the source/drain electrodes 14a and 14b are formed at crossing points of the two lines, thereby constituting a switching device. The switching device is a semiconductor layer and mainly composed of amorphous thin film transistor (a-si TFT) having amorphous silicon material.

Also, the capacitor lower electrode 11c, the gate insulating film 12, and the capacitor upper electrode 14c constitute a storage capacitor, thereby maintaining an electrified charge in a liquid crystal.

Figure 2:
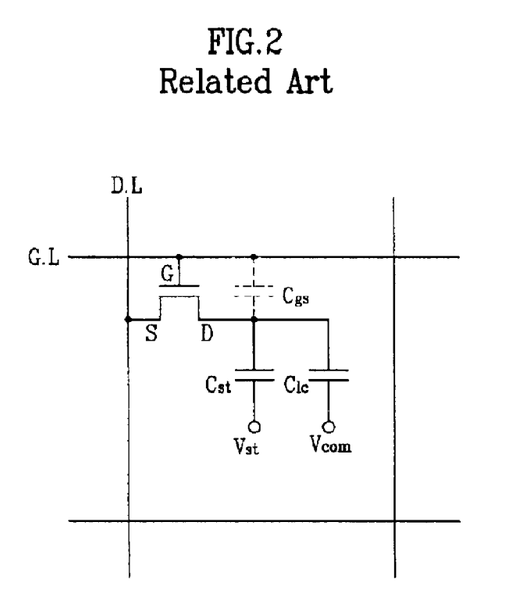
FIG. 2 illustrates an equivalent circuit diagram for a pixel.

That is, as shown in FIG. 2, a parasitic capacitance Cgs is generated at an overlapped part of the gate electrode G and the source/drain electrodes S/D. The parasitic capacitance generates a direct current voltage offset for an alternating current voltage, that is V. Since the direct current voltage offset causes effects such as a flicker, image sticking, and unequal screen brightness, a storage capacitor is designed to reduce a variation of □V.

Especially if the capacitance of a capacitor is increased, picture quality is remarkably enhanced, which is achieved by enlarging areas of capacitor upper and lower electrodes. However, the larger the areas of the capacitor electrodes, the lower the aperture ratio, thereby limiting the increase of in the capacitance of the capacitor.

In FIG. 2, D.L is a data line to which a signal voltage is applied, G.L is a gate line to which an injection signal is applied, Clc is a capacitance by a liquid crystal between a pixel electrode and a common electrode (Vcom), and Cst is a storage capacitance formed between the capacitor upper electrode and the lower electrode (Vst).

Referring to FIG. 1B, subsequently, benzocyclobutene (BCB) is deposited to a predetermined thickness on an entire surface including the data line 14, thereby forming a passivation film 15. The passivation film 15 is selectively removed, so that a first contact hole 17 for exposing a part of a drain electrode 14b and a second contact hole 18 for exposing a part of a capacitor upper electrode 14c are formed.

Then, a pixel electrode of indium tin oxide (ITO) material is formed to connect to the drain electrode 14b and the capacitor upper electrode 14c through the first and second contact holes 17 and 18.

Finally, though not shown, a color filter substrate including a black matrix, a color filter layer of R, G, and B, and a common electrode of ITO material are bonded to the array substrate on which the aforementioned patterns are formed. Also, a liquid crystal is injected into a space corresponding to about several micrometers between the array substrate and the color filter substrate, thereby completing the fabrication of a liquid crystal display device.

However, the related art array substrate of a liquid crystal display device has the following problems.

First, the capacity of a storage capacitor is determined by an area of an electrode consisting of the capacitor. The more a region of the capacitor is increased, the lower the aperture ratio. Therefore, a great deal of bright backlight is expended to display the same brightness, thereby increasing power consumption.

Second, corresponding to a recent trend of a high resolution of a liquid crystal display, a size of a pixel becomes small, which results in making the capacity of a capacitor low. Accordingly, driving characteristics of a device are lowered in such a manner that the voltage greatly decreases and the holding ratio for off-current of a switching device is decreased.

SUMMARY OF THE INVENTION

Accordingly, the present invention is directed to an array substrate of a liquid crystal display device that substantially obviates one or more problems due to limitations and disadvantages of the related art.

An advantage of the present invention is to provide an array substrate of a liquid crystal display device which can improve an image quality by forming a storage capacitor of a large capacity with a transparent conductive material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, an array substrate of a liquid crystal display device includes a gate line formed on the array substrate and a gate electrode diverged from the gate line; a common line formed simultaneously with the gate line, composed of an opaque metal which is substantially the same material as the gate line and arranged parallel to the gate line; a first electrode of a storage capacitor composed of a transparent conductive material on the common line; a gate insulating film covering the gate line, the gate electrode, and the first electrode of a storage capacitor; a semiconductor layer formed to overlap the gate electrode on the gate insulating film; source/drain electrodes arranged on the semiconductor layer with a constant interval; a data line connected to the source electrode and arranged perpendicularly to the gate line; a passivation film formed on the data line, the source/drain electrodes, and the gate insulating film; a first contact hole formed by removing the passivation film so as to expose a part of the drain electrode; and a pixel electrode connected to the drain electrode through the first contact hole above the passivation film.

At this time, since a storage capacitor having a large area is formed with a transparent conductive material, the aperture ratio is not lowered. Also, the storage capacitor is advantageous for high resolution liquid crystal display devices with a storage capacitor having a large capacity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings.

DETAILED DESCRIPTION OF TI-IE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 3A:
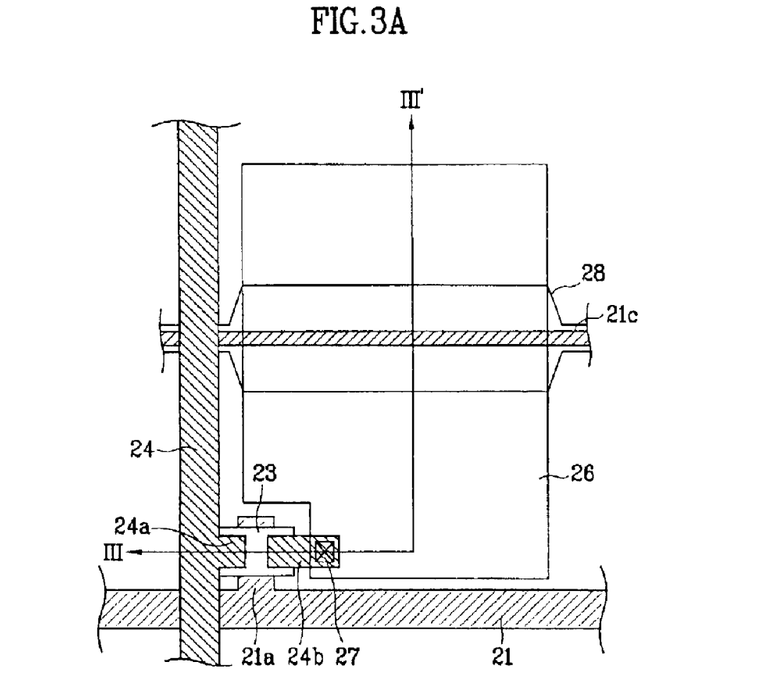
FIGS. 3A and 3B illustrate a plan view and a sectional view of a liquid crystal display device according to a first embodiment of the present invention.
Figure 3B:
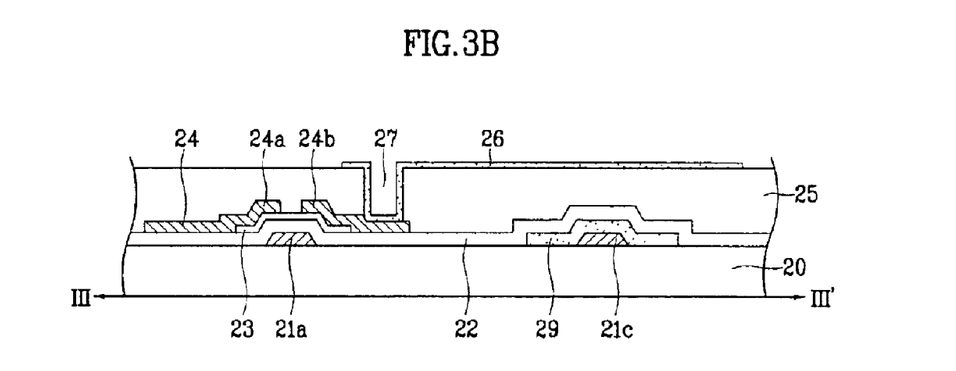

FIGS. 3A and 3B are a plan view and a sectional view of a liquid crystal display device according to a first embodiment of the present invention.

The first embodiment relates to a liquid crystal display device including a capacitor lower electrode formed with a large area of transparent material in a predetermined region of a pixel region and a storage capacitor which is in a region of a pixel electrode, wherein the capacitor lower electrode is connected to a capacitor supplementary electrode having a low resistance.

At this time, the reason why the capacitor supplementary electrode is further included is to transmit voltage through the capacitor supplementary electrode having a low resistance metal since a resistance of indium tin oxide (ITO) corresponding to a material of the capacitor lower electrode is very high.

Referring to FIGS. 3A and 3B, a method for fabricating a liquid crystal display device will be explained. First, a metal having a low resistance such as aluminum (Al), copper (Cu), tungsten (W), molybdenum (Mo), titanium (Ti), Al alloy, etc. is deposited on an entire surface of a substrate 20 by a sputtering method, and patterned by a photolithography method, thereby forming a gate line 21, a gate electrode 21a diverged from the gate line 21, and a capacitor supplementary electrode 21c parallel to the gate line 21. At this time, since a material for the gate line is opaque, it is advantageous to form the capacitor supplementary electrode 21c as small as possible to provide a high aperture ratio of the device.

Then, a transparent conductive material such as ITO is deposited on an entire surface including the gate line 21 and patterned, thereby forming a capacitor lower electrode 29 covering the capacitor supplementary electrode 21c. At this time, whereas the capacitor lower electrode 29 of transparent material is formed over a large area so as to enhance the capacity of the storage capacitor, an overlapped part with the data line 24 is formed in a small area so as to prevent a parasitic capacitance with the data line from occurring.

Meanwhile, the capacitor lower electrode 29 can be formed as a line shape along the capacitor supplementary electrode 21c as shown in drawings, and can be formed as ah independent island shape so as to maintain a low resistance.

Then, an inorganic insulating film such as silicon nitride (SiNx), silicon oxide (SiOx), or etc. is deposited on an entire surface including the capacitor lower electrode 29 by a sputtering method, so that a gate insulating film 22 is formed. Also, amorphous silicon is deposited on the gate insulating film 22 above the gate electrode 21a, so that a semiconductor layer 23 is formed.

Subsequently, a metal of a low resistance such as Al, Cu, W, Mo, Ti, Al alloy, etc. is deposited on an entire surface including the semiconductor layer 23, and patterned by a photolithography method, thereby forming a data line 24 crossing the gate line 21 and source/drain electrodes 24a and 24b diverged from the data line 24.

Herein, the gate line 21 and the data line 24 crossing each other define a plurality of pixel regions, and the gate electrode 21a, the gate insulating film 22, the semiconductor layer 23, and the source/drain electrodes 24a and 24b formed at the crossing points of the gate line 21 and the data line 24 form a thin film transistor.

Then, an organic insulating film such as benzocyclobutene (BCB), acryl resin, or etc. or an inorganic insulating film such as SiOx, SiNx, or etc. is deposited with a predetermined thickness on an entire surface including the data line 24, thereby forming a passivation film 25. The passivation film 25 is then selectively removed, so that a contact hole 27 for exposing the drain electrode 24b is formed and then a pixel electrode 26 of ITO material is formed to connect to the drain electrode 24b through the contact hole 27.

At this time, a part of the pixel electrode 26 corresponding to the capacitor lower electrode 29 is a capacitor upper electrode and constitutes a storage capacitor of a large capacity with the capacitor lower electrode 29 having a large area.

A storage capacitor having a low resistance and a large storage capacity is obtained by setting the transparent electrode of the storage capacitor in a large area and by setting the opaque capacitor supplementary electrode to be in a small area.

Figure 4A:
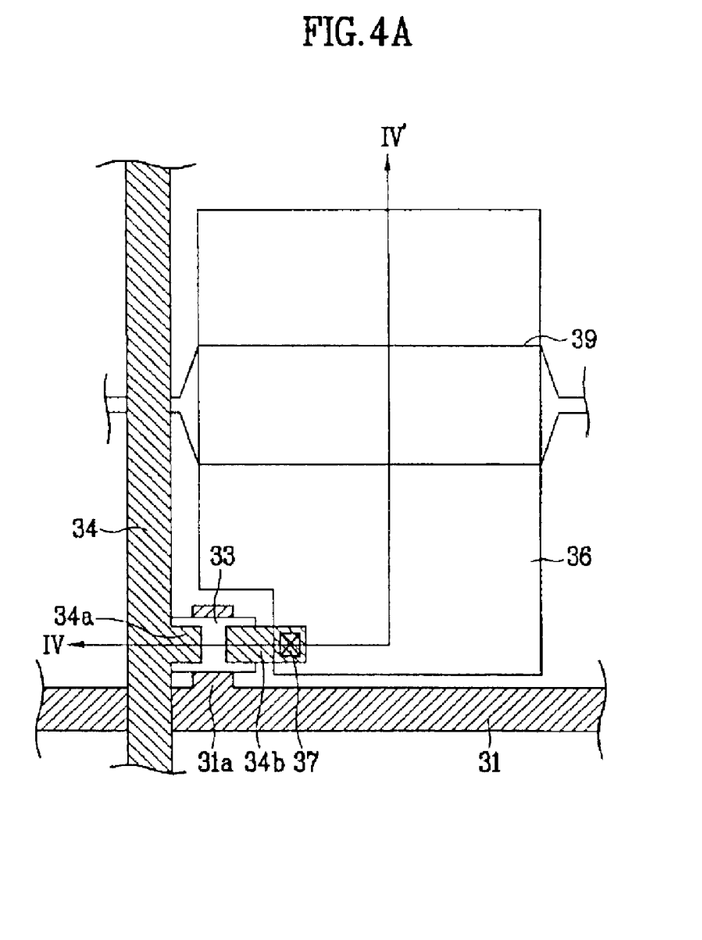
FIGS. 4A to 4C illustrate a plan view and a sectional view of a liquid crystal display device according to a second embodiment of the present invention.
Figure 4B:
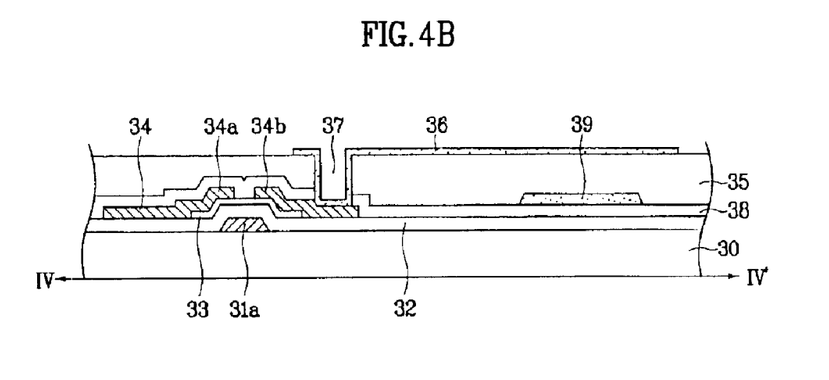
Figure 4C:
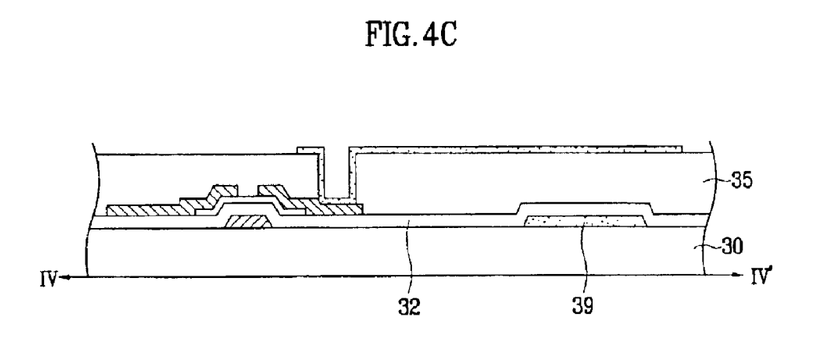

FIGS. 4A to 4C illustrate a plan view and a sectional view of a liquid crystal display device according to a second embodiment of the present invention.

The second embodiment relates to a liquid crystal display device including a large storage capacitor having a transparent capacitor lower electrode in a large area and a region of a pixel electrode. The second embodiment is different form the first embodiment in that an aperture ratio becomes maximum without additionally forming the capacitor supplementary electrode of an opaque metal.

Referring to FIGS. 4A and 4B, a method for fabricating the liquid crystal display device will be explained. First, a metal having a low resistance is deposited on an entire surface of a substrate 30 by a sputtering method, and patterned by a photolithography method, thereby forming a gate line 31 and a gate electrode 31a diverged from the gate line 31.

Next, an inorganic insulating film such as SiNx, or SiOx is deposited on an entire surface including the gate line 31 and the gate electrode 31a by a sputtering method, thereby forming a gate insulating film 32. Then, pure amorphous silicon and doped amorphous silicon are consecutively deposited on the gate insulating film 32 above the gate electrode 31a, thereby forming a semiconductor layer 33.

Subsequently, a metal having a low resistance is deposited on an entire surface including the semiconductor layer 33, and patterned by a photolithography method, thereby forming a data line 34 crossing the gate line 31 and source/drain electrodes 34a and 34b diverged from the data line 34.

Herein, the gate line 31 and the data line crossing to each other define a plurality of pixel regions, and the gate electrode 31a, the gate insulating film 32, the semiconductor layer 33, and the source/drain electrodes 34a and 34b formed at the crossing points of the gate line and the data line form a thin film transistor.

Then, SiNx is deposited on an entire surface including the data line 34, so that an insulating film 38 for insulating the data line layer and a capacitor lower electrode 39 which will be formed subsequently, and a capacitor lower electrode 39 of ITO material is formed at a predetermined region above the insulating film 38.

Subsequently, BCB, acryl resin, SiOx, or SiNx are deposited on an entire surface including the capacitor lower electrode 39, the data line 34, and the source/drain electrodes 34a and 34b with a predetermined thickness, thereby forming a passivation film 35. Then, the passivation film 35 is selectively removed, so that a contact hole 37 for exposing the drain electrode 34b is formed. A pixel electrode 36 of ITO material connected to the drain electrode through the contact hole 37 is then formed.

At this time, a region of the pixel electrode 36 opposite to the capacitor lower electrode 39 is a capacitor upper electrode and constitutes a storage capacitor with the capacitor lower electrode 39 having a large area.

Meanwhile, besides the method for forming the capacitor lower electrode 39 after the data line layer is formed, it is possible to form the capacitor lower electrode 39 after the gate line layer is formed as shown in FIG. 4C.

Figure 5A:
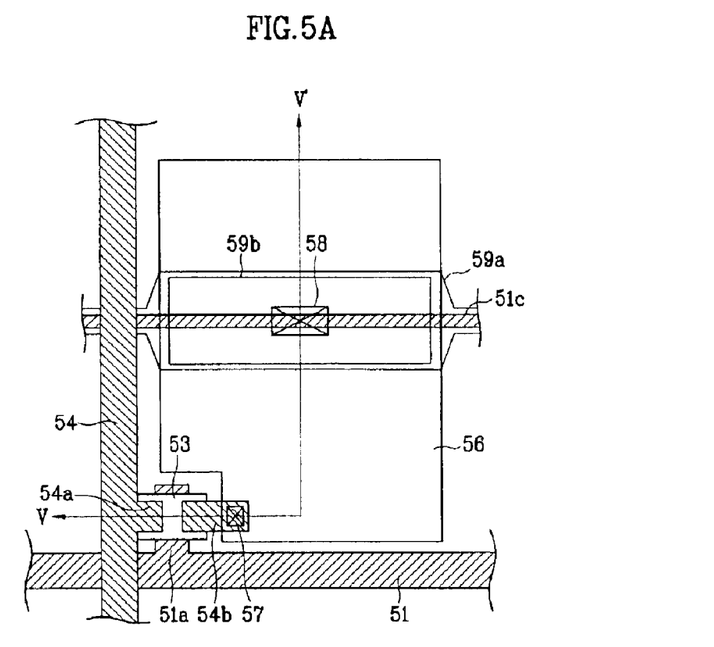
FIGS. 5A to 5B illustrate a plan view and a sectional view of a liquid crystal display device according to a third embodiment of the present invention.
Figure 5B:
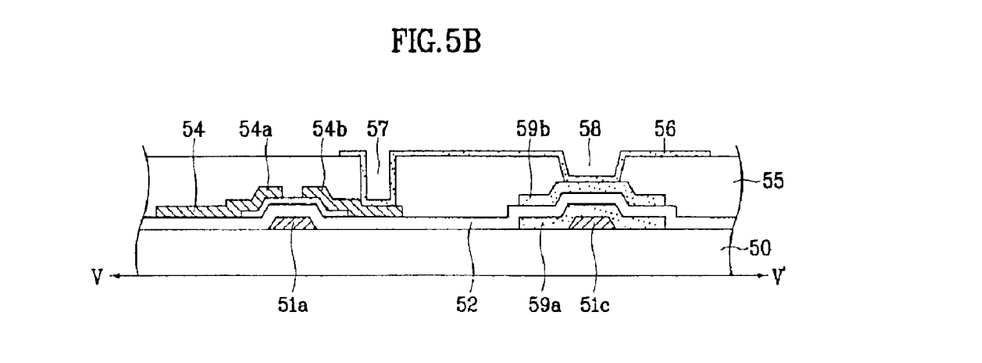

FIGS. 5A to 5B illustrate a plan view and a sectional view of a liquid crystal display device according to a third embodiment of the present invention.

The third embodiment relates to a liquid crystal display device including a storage capacitor having a capacitor upper electrode and a capacitor lower electrode formed with large areas at both sides of a thin insulating film. Herein, the capacitor lower electrode is connected to a capacitor supplementary electrode of a low resistance and receives a voltage, and the capacitor upper electrode is connected to a pixel electrode and receives a voltage.

At this time, since the capacitor lower electrode of ITO material has a very high resistance, a time for transmitting a voltage is delayed. Accordingly, a capacitor supplementary electrode of a low resistance metal is connected to the capacitor lower electrode of ITO material to transmit a voltage.

Referring to FIGS. 5A and 5B, a method for fabricating a liquid crystal display device will be explained. First, a metal having a low resistance is deposited on an entire surface of a substrate 50 by a sputtering method, and patterned by a photolithography method, thereby forming a gate line 51, a gate electrode 51a diverged from the gate line 51, and a capacitor supplementary electrode 51c parallel to the gate line 51 in a line shape. At this time, since the gate line is composed of an opaque material, the capacitor supplementary electrode 51c is formed in a small area, thereby preventing an aperture ratio from being lowered.

Then, a capacitor lower electrode 59a is formed at a predetermined region including the capacitor supplementary electrode 51c. At this time, the capacitor lower electrode 59a of transparent conductive material is formed in a large area so as to enhance a capacity of a storage capacitor. However, a part of the capacitor lower electrode 59a overlapped with the data line is formed in a small area so as to prevent a parasitic capacitance from occurring.

Also, the capacitor lower electrode 59a may be formed in a line shape along the capacitor supplementary electrode 51c, and may be formed in an independent island shape to be connected to the capacitor supplementary electrode 51c so as to maintain a low resistance.

Then, an inorganic insulating film such as SiNx or SiOx is deposited on an entire surface including the capacitor lower electrode 59a by a sputtering method, so that a gate insulating film 52 is formed. Amorphous silicon is then deposited on the gate insulating film 52 above the gate electrode 51a, so that a semiconductor layer 53 is formed.

Subsequently, a metal of a row resistance is deposited on an entire surface including the semiconductor layer 53, and patterned by a photolithography method, so that a data line 54 crossing the gate line 51, a source electrode 54a diverged from the data line 54 above the semiconductor layer 53, and a drain electrode 54b formed above the semiconductor layer 53 apart from the source electrode 54a with a constant interval are formed.

Then, a transparent conductive material such as ITO is deposited on an entire surface including the gate insulating film 52 and patterned, so that a capacitor upper electrode 59b facing the capacitor lower electrode 59a is formed.

Subsequently, an organic insulating film such as BCB, acryl resin, or etc. or an inorganic insulating film such as SiOx, SiNx, or etc. is deposited with a predetermined thickness on an entire surface including the capacitor upper electrode 59b, thereby forming a passivation film 55. The passivation film 55 is then selectively removed, so that a first contact hole 57 for exposing the drain electrode 54b and a second contact hole 58 for exposing the capacitor upper electrode 59b are formed and then a pixel electrode 56 of ITO material is formed to connect to the drain electrode 54b and the capacitor upper electrode 59b through the first and second contact holes 57 and 58.

At this time, the capacitor lower electrode 59a of a large area is formed to connect to the capacitor supplementary electrode 51c, the capacitor upper electrode 59b having a large area is formed to connect to the pixel electrode 56, and the thin gate insulating film 52 is formed between the capacitor upper electrode 59a and the capacitor lower electrode 59b to constitute a storage capacitor.

A storage capacitor having a low resistance and a large storage capacity is obtained by setting the transparent electrode of the storage capacitor in a large area and by setting the opaque capacitor supplement electrode in a small area. Also, since an insulating film between the storage capacitor electrodes is thin, a larger storage capacity can be obtained.

Figure 6A:
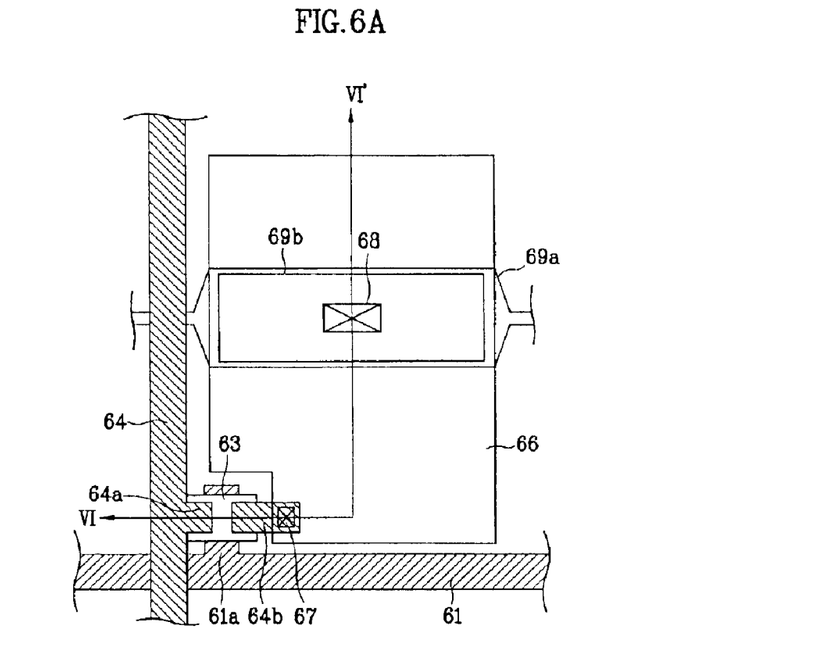
FIGS. 6A and 6B illustrate a plan view and a sectional view of a liquid crystal display device according to a fourth embodiment of the present invention.
Figure 6B:
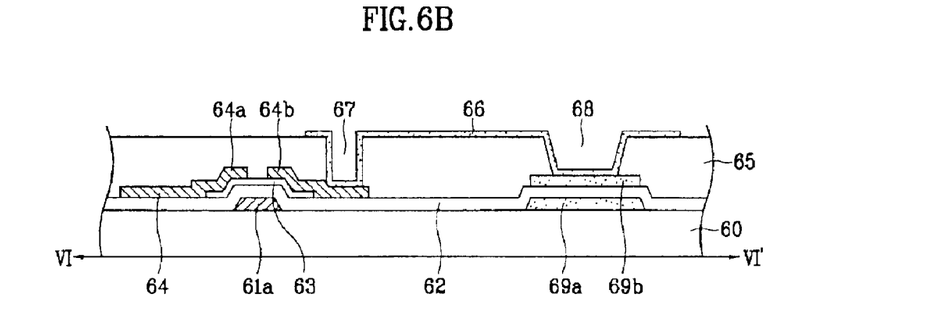

FIGS. 6A and 6B illustrate a plan view and a sectional view of a liquid crystal display device according to a fourth embodiment of the present invention.

The fourth embodiment relates to a liquid crystal display device including a storage capacitor having a capacitor upper electrode and a capacitor lower electrode formed having wide areas at both sides of a thin insulating film. Since the insulating film between the capacitor upper electrode and the capacitor lower electrode is thin, a larger storage capacity can be obtained. Also, since a capacitor supplementary electrode of an opaque metal material is not additionally formed differently from the third embodiment, an aperture ratio can be maximum.

At this time, the capacitor upper electrode is connected to a pixel electrode.

Referring to FIGS. 6A and 6B, a method for fabricating a liquid crystal display device will be explained. First, a metal having a low resistance is deposited on an entire surface of a substrate 60 by a sputtering method, and patterned by a photolithography method, thereby forming a gate line 61, a gate electrode 61a diverged from the gate line 61.

Then, a transparent conductive material such as ITO is deposited on an entire surface including the gate line 61 and patterned, so that a capacitor lower electrode 69a is formed. At this time, the capacitor lower electrode 69a of a transparent conductive material is formed in a large area so as to enhance a capacity of a storage capacitor. However, a part of the capacitor lower electrode 69a overlapped with the data line is formed in a small area so as to prevent a parasitic capacitance from occurring.

Then, an inorganic insulating film such as SiNx or SiOx is deposited on an entire surface including the capacitor lower electrode 69a by a sputtering method, so that a gate insulating film 62 is formed. Amorphous silicon is then deposited on the gate insulating film 62 above the gate electrode 61a, so that a semiconductor layer 63 is formed.

Subsequently, a metal having a low resistance is deposited on an entire surface including the semiconductor layer 63, and patterned by a photolithography method, so that a data line 64 crossing the gate line 61, a source electrode 64a diverged from the data line 64 above the semiconductor layer 63, and a drain electrode 64b formed above the semiconductor layer 63 apart from the source electrode 54a with a constant interval are formed.

Then, a transparent conductive material such as ITO is deposited on an entire surface including the gate insulating film 62 and patterned, so that a capacitor upper electrode 69b facing the capacitor lower electrode 69a is formed. At this time, the capacitor upper electrode 69b is formed to be substantially the same size as the capacitor lower electrode 69a so as to enhance a capacity of the storage capacitor.

Subsequently, BCB, acryl resin, SiOx, or SiNx is deposited with a predetermined thickness on an entire surface including the capacitor upper electrode 69b, thereby forming a passivation film 65. The passivation film 65 is then selectively removed, so that a first contact hole 67 for exposing the drain electrode 64b and a second contact hole 68 for exposing the capacitor upper electrode 69b are formed and then a pixel electrode 66 of ITO material is formed and connected to the drain electrode 64b and the capacitor upper electrode 69b through the first and second contact holes 67 and 68.

At this time, the capacitor upper and lower electrodes 69a and 69b having large areas, and the thin gate insulating film 62 formed between the capacitor upper and lower electrodes 69a and 69b constitute a storage capacitor.

A storage capacitor of a large storage capacity can be obtained by providing the transparent electrodes of the storage capacitor in a large area and by providing an insulating film between the storage capacitor thinly.

An array substrate of a liquid crystal display device according to the present invention has the following advantages.

First, a capacitor electrode of a large area is formed by using a transparent conductive material, thereby obtaining a storage capacitor of a large capacity.

Accordingly, a picture quality can be improved without decreasing aperture ratio.

Second, corresponding to a recent trend that a size of a unit pixel becomes small according to high resolution of a liquid crystal display, a storage capacitor having a large capacity is formed, so that the voltage of a liquid crystal is prevented from being lowered and a holding ratio according to off-current of a switching device is increased.

Accordingly, a driving characteristic of a device is improved, and a reliability of a high resolution liquid crystal display device is increased.

It will be apparent to those skilled in the art than various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An array substrate of a liquid crystal display device comprising:

a gate line of opaque metal formed on an array substrate and a gate electrode diverged from the gate line;

a common line composed of at least one of materials comprising of the gate line and arranged parallel to the gate line;

a first electrode of a storage capacitor composed of a transparent conductive material on the common line, wherein the first electrode of the storage capacitor is formed as a line shape along the common line;

a gate insulating film covering the gate line, the gate electrode, and the first electrode of the storage capacitor;

a semiconductor layer formed to overlap the gate electrode on the gate insulating film;

source and drain electrodes arranged with a constant interval on the semiconductor layer;

a data line connected to the source electrode and arranged perpendicularly to the gate 15 line;

an insulating layer formed on the data line, the source/drain electrodes, and the gate insulating film;

a first contact hole formed by removing the insulating layer so as to expose a part of the drain electrode; and a pixel electrode connected to the drain electrode through the first contact hole above the insulating layer.

2. The array substrate of a liquid crystal display device of claim 1, wherein the first electrode of a storage capacitor is formed as an independent island shape.

3. The array substrate of a liquid crystal display device of claim 1, wherein the common line is narrower than the gate line.

4. The array substrate of a liquid crystal display device of claim 1, wherein the first electrode of a storage capacitor is wider than the gate line.

5. The array subsume of a liquid crystal display device of claim 1, wherein the common line is narrower than the gate line, and the first electrode of a storage capacitor is wider than the gate line.

6. The array substrate of a liquid crystal display device of claim 1, wherein an overlapped part of the first electrode of a storage capacitor with the data line is smaller than other parts of the first electrode of a storage capacitor.

7. The array substrate of a liquid crystal display device of claim 1, wherein the first electrode of a storage capacitor is composed of indium tin oxide (ITO) or indium tin zinc oxide (ITZO).

8. The array substrate of a liquid crystal display device of claim 1, wherein the insulating layer is composed of one of SiNx, SiOx, BCB, and acryl resin.

9. The array substrate of a liquid crystal display device of claim 1 further comprising:

a second electrode of a storage capacitor formed in the same layer as the source/drain electrode, arranged in a pixel to overlap a part of the first electrode of a storage capacitor, and composed of a transparent conductive material; and a second contact hole which exposes a part of the second electrode of a storage capacitor so as to be electrically connected to the pixel electrode.

10. The array substrate of a liquid crystal display device of claim 9, wherein the first electrode of a storage capacitor and the second electrode of a storage capacitor are wider than the gate line.

11. The array substrate of a liquid crystal display device of claim 9, wherein an overlapped part of the first electrode of a storage capacitor with the data line is smaller than other parts of the first electrode of a storage capacitor.

12. The array substrate of a liquid crystal display device of claim 9, wherein the first and second electrodes of a storage capacitor are composed of indium tin oxide (ITO) or indium tin zinc oxide (ITZO).

13. The array substrate of a liquid crystal display device of claim 9, wherein the insulating layer is composed of one of SiNx, SiOx, BCB, and acryl resin.

* * * * *